US009821288B2

(12) United States Patent
Cerk et al.

(10) Patent No.: US 9,821,288 B2
(45) Date of Patent: Nov. 21, 2017

(54) MULTI-ADDITIVE DELIVERY SYSTEM

(71) Applicant: Dow Global Technologies LLC, Midland, MI (US)

(72) Inventors: Frank J. Cerk, Lake Jackson, TX (US); Pradeep Jain, Jr., Lake Jackson, TX (US); Michelle D. Dirk, Calgary (CA); Harold W Boone, Sugar Land, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 568 days.

(21) Appl. No.: 14/385,792

(22) PCT Filed: Apr. 19, 2013

(86) PCT No.: PCT/US2013/037281
§ 371 (c)(1),
(2) Date: Sep. 17, 2014

(87) PCT Pub. No.: WO2013/169466
PCT Pub. Date: Nov. 14, 2013

(65) Prior Publication Data
US 2015/0231590 A1    Aug. 20, 2015

Related U.S. Application Data

(60) Provisional application No. 61/645,415, filed on May 10, 2012.

(51) Int. Cl.
*B01J 19/00* (2006.01)
*B01J 19/24* (2006.01)

(52) U.S. Cl.
CPC .. *B01J 19/0006* (2013.01); *B01J 2219/00164* (2013.01); *B01J 2219/00761* (2013.01); *Y10T 137/0318* (2015.04)

(58) Field of Classification Search
CPC .. Y10T 137/00; Y10T 137/0318; B01J 19/00; B01J 19/0006; B01J 19/24;
(Continued)

(56) References Cited

U.S. PATENT DOCUMENTS 3,257,375 A    6/1966   Norwood
3,691,142 A *  9/1972   Petersen ................. C08F 10/00
                                                          526/336

(Continued)

FOREIGN PATENT DOCUMENTS

GB          1067422        5/1967
WO        2004014543       2/2004
(Continued)

OTHER PUBLICATIONS

Chinese Office Action dated Oct. 20, 2015; from Chinese counterpart Application No. 201380022629.X.
(Continued)

*Primary Examiner* — Natasha Young
(74) *Attorney, Agent, or Firm* — Cantor Colburn LLP

(57) ABSTRACT

An apparatus and method for delivery of additives(s), e.g., catalyst, co-catalyst, scavengers, and/or other reaction- or product-modifying agents, to a reaction or mixing site, such as a reaction vessel, offers the capability for multi-additive delivery and customization of additive selection, flow and flow rate, and if desired, mixing thereof, without production train shutdowns. The invention includes at least two additive sources that are detachably connected, with conduit, to the reaction or mixing site, and a process control means, preferably automated, that is capable of initiating, terminating, and determining the rate of flow from the additive sources.

6 Claims, 1 Drawing Sheet

(58) Field of Classification Search
CPC .... B01J 2219/00049; B01J 2219/00164; B01J 2219/00761
See application file for complete search history.

(56) References Cited

U.S. PATENT DOCUMENTS

| | | | |
|---|---|---|---|
| 5,022,428 | A | 6/1991 | Vilines |
| 5,066,741 | A | 11/1991 | Campbell, Jr. |
| 5,137,436 | A | 8/1992 | Vogel |
| 5,153,157 | A | 10/1992 | Hlatky et al. |
| 5,184,943 | A | 2/1993 | Walton |
| 5,198,401 | A | 3/1993 | Turner et al. |
| 5,206,197 | A | 4/1993 | Campbell, Jr. |
| 5,234,322 | A | 8/1993 | Daniels et al. |
| 5,241,025 | A | 8/1993 | Hlatky et al. |
| 5,384,299 | A | 1/1995 | Turner et al. |
| 5,388,768 | A | 2/1995 | Moses |
| 5,433,924 | A | 7/1995 | Sagar et al. |
| 5,502,124 | A | 3/1996 | Crowther et al. |
| 5,948,871 | A | 9/1999 | Goode et al. |
| 6,109,286 | A * | 8/2000 | Johnston ............ B67D 7/74 137/15.05 |
| 6,135,724 | A | 10/2000 | Yoder et al. |
| 6,150,478 | A | 11/2000 | Ramamurthy et al. |
| 6,257,575 | B1 | 7/2001 | Ortega |
| 6,395,671 | B2 | 5/2002 | LaPointe |
| 7,153,478 | B2 | 12/2006 | Xu et al. |
| 9,163,134 | B2 * | 10/2015 | Lee ................ C08F 114/06 |
| 2013/0064738 | A1 | 3/2013 | Berger et al. |

FOREIGN PATENT DOCUMENTS

| | | |
|---|---|---|
| WO | 2010047690 | 4/2010 |
| WO | WO 2013/032142 A2 * | 3/2013 |

OTHER PUBLICATIONS

Chinese Response to Office Action dated Mar. 4, 2016; from Chinese counterpart Application No. 201380022629.X.
International Search Report for PCT Patent Application No. PCT/US2013/037281 dated Oct. 24, 2013, 4 pages.
International Preliminary Report on Patentability for PCT/US2013/037281 dated Nov. 11, 2014, 7 pages.
EP Office Action dated Dec. 19, 2014; from EP counterpart Application No. 13720658.7.
EP Response to Office Action dated Jun. 29, 2015; from EP counterpart Application No. 13720658.7.
GCC Office Action dated Apr. 6, 2016; from GCC counterpart Application No. GC 2013-24333.
GCC Office Action dated Oct. 31, 2016; from GCC counterpart Application No. GC 2013-24338.

* cited by examiner

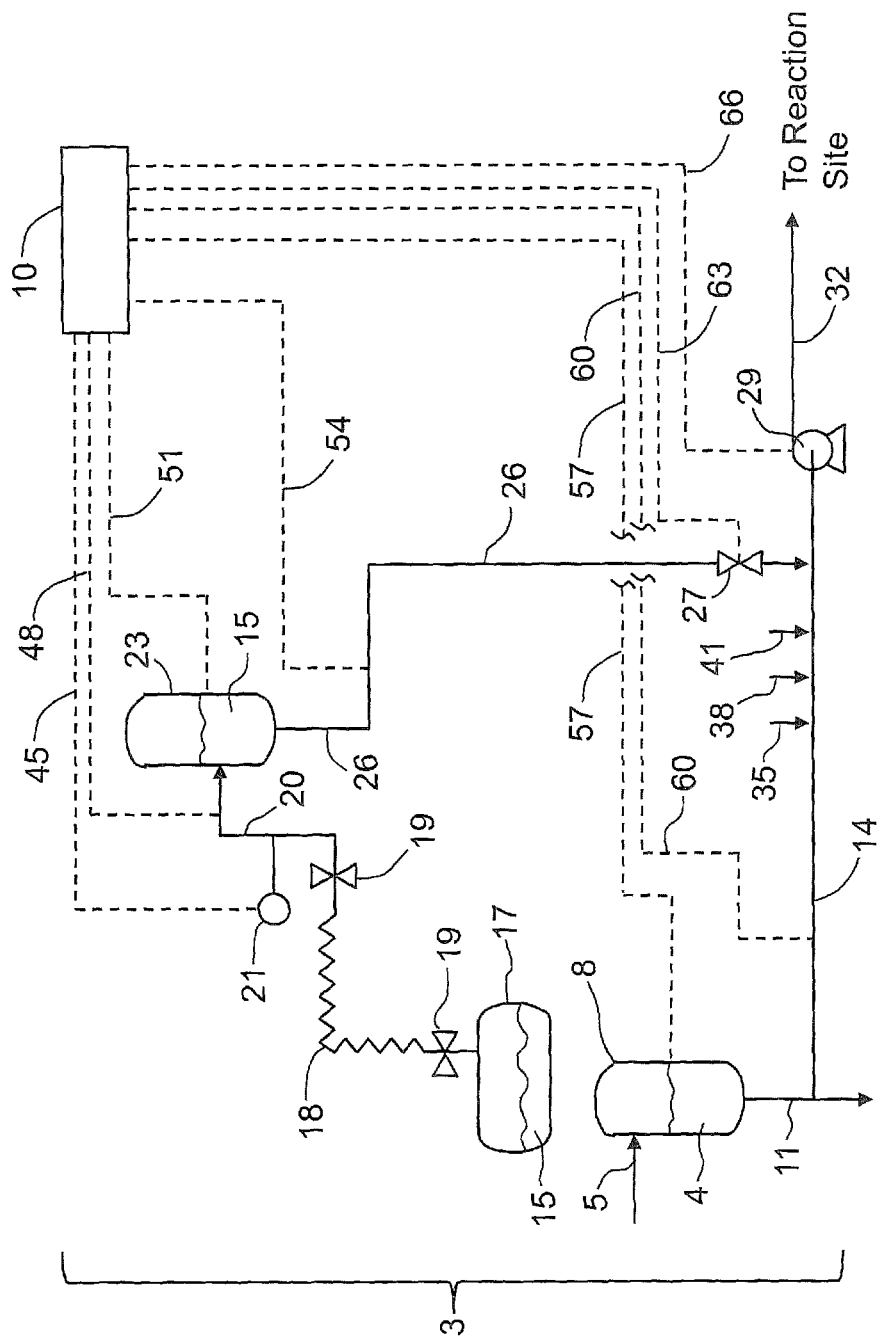

MULTI-ADDITIVE DELIVERY SYSTEM

REFERENCE TO RELATED APPLICATIONS

The present application claims the benefit of U.S. Provisional Application No. 61/645,415, filed on May 10, 2012 and is a national stage of International Application No. PCT/US2013/037281, filed Apr. 19, 2013, now WO 2013/169466. The contents of the aforementioned applications are incorporated herein by reference in their entirety.

BACKGROUND

Field of the Invention

The invention relates to methods and apparatuses for delivering additives to reacting materials. More particularly, it relates to methods and apparatuses for enabling operations wherein reaction-modifying additives can be substituted and/or combined quickly, easily, and in a customizable fashion.

Background of the Invention

In many commercial production facilities today, additive feed systems are permanently hard-piped to a mixing and/or reaction site, such as a reaction vessel. This enables the selected additive, or mixture of additives, to be fed into the site at a desired time in the operation cycle to ultimately produce a desired product. Such products may include, in non-limiting example, polymerized products such as polyethylenes, polyurethanes, and polypropylenes; non-polymerized products; and the like. In these and in similar applications, a single additive, such as, for example, a catalyst, co-catalyst, scavenger, other reaction- or product-modifying additive, or combination thereof, is typically offloaded into storage tanks, combined batchwise to a smaller "day" or "run" tank, and then the material from each run tank is metered and fed to a metering pump, from whence it is introduced into a reactor with reactant materials or added to a post-reactor site for product modification Unfortunately, the above-described arrangement has certain drawbacks. One is that, when the additive has been exhausted, production must usually be shut down in order to replenish the run tank.

Another drawback is that it is relatively difficult to switch to a different additive in order to produce a different product. This is because, again, the overall production operation must first be shut down, the input line must be flushed in some way to prevent cross-contamination, and the production (with or without different reactant materials) must then be reinitiated. In some instances, it may be necessary to waste large proportions of tanks of additives where only a small amount is needed for a production run. Alternatively, a whole new production line may be needed, which is very expensive.

A third drawback is that it is also difficult or impossible to customize, or experiment to customize, a variety of additives. This includes customization as to types, combination of types, and/or concentrations thereof. In particular, it is difficult to customize such "on the fly," i.e., during operation, meaning without shutting down the production line as a whole and installing temporary tubing of some type.

In view of the above, it would be desirable to be able to reduce or eliminate some or all of the drawbacks mentioned hereinabove.

SUMMARY OF THE INVENTION

In one aspect, the present invention provides an apparatus for delivery of an additive to a reaction or mixing site, comprising (a) at least one reaction or mixing site having therein a means of ingress, as to which is detachably connected via at least one conduit to (b) at least one additive source, the at least one additive source comprising at least one additive, the at least one additive source being connected directly or indirectly to, and controlled by, (c) a process control means, the process control means being capable of controlling flow of the at least one additive from the at least one additive source to the means of ingress, wherein controlling flow includes initiation, cessation, and rate of flow of the at least one additive.

In one embodiment, the apparatus further comprises (d) at least a second additive source, the at least a second additive source comprising at least a second additive, the at least a second additive source being detachably connected via at least one conduit to the means of ingress, provided that the at least one additive source and the at least a second additive source are not concurrently detachably connected to the means of ingress; the at least a second additive source being connected directly or indirectly to, and controlled by, the process control means, concurrently with being detachably connected to the means of ingress, and further provided that the at least one additive and the at least a second additive are the same or different.

In another aspect, the invention provides a method for delivery of an additive to a reaction or mixing site, comprising motivating at least one additive to flow to a reaction or mixing site via at least one conduit to and through a means of ingress to the reaction or mixing site, wherein the means of ingress is detachably connected via the at least one conduit thereto, and wherein the at least one additive flows from at least one additive source, the at least one additive source being also connected directly or indirectly to, and controlled by, a process control means, the process control means motivating and controlling flow of the at least one additive from the at least one additive source via the at least one conduit to the means of ingress to the reaction or mixing site, wherein controlling flow includes initiation, cessation, and rate of flow, under conditions such that the at least one additive is delivered at a pre-selected time, for a pre-selected duration, and at a pre-selected rate.

In one embodiment the method further comprises motivating at least a second additive to flow to the reaction or mixing site via the least one conduit and through the means of ingress, wherein the at least a second additive flows from at least a second additive source, the at least a second additive source being also connected directly or indirectly to, and controlled by, the process control means, the process control means motivating and controlling flow of the at least a second additive from the at least a second additive source, at least a second additive source, the at least a second additive source being detachably connected via at least one conduit to the means of ingress, provided that the at least one additive source and the at least a second additive source are not concurrently detachably connected to the means of ingress; the at least a second additive source being connected directly or indirectly to, and controlled by, the process control means, concurrently with being detachably connected to the means of ingress, and further provided that the at least one additive and the at least a second additive are the same or different.

DESCRIPTION OF THE DRAWINGS

FIG. 1 is a schematic drawing of one embodiment of the inventive apparatus, showing multiple delivery means for introducing at least one additive, from at least two additive sources or combinations thereof, to a reaction site.

DETAILED DESCRIPTION OF THE EMBODIMENTS

The present invention is, in general, a multi-additive delivery system offering important advantages over previous, hard-piped systems that were designed to enable delivery of a single additive, e.g., a catalyst, co-catalyst, scavenger, or other reaction- or product-modifying additives to a reaction or mixing site. Such reaction or mixing site may be, in non-limiting embodiments, a polymerization or other type of vessel. In particular, the invention enables simplified delivery of one or more additives to the vessel directly, without requiring intermediate, extended-time additive storage and/or mix tanks. The delivery is desirably automated to enable simultaneously controlling the flow rate of, potentially, several components (e.g., catalyst, co-catalyst, scavenger), enabling faster and more efficient transitions from one additive or additive family to another. Such transitions may also be thereby made inherently safer, because of the capability to also control line-flushings using the same automated means. Furthermore, diluents (solvents) may be added easily to the system to improve dissolution of the additive or additives and improve flow control; additive types may be "swung on the fly" (without shutting down the operation); and empty additive containers likewise replenished without shutdown. These advantages and the means and methods of their attainment will be described further hereinbelow.

The invention is a combination of an apparatus comprising many potential embodiments and a method that is essentially based upon having available the capabilities of the inventive apparatus. Thus, with respect to terminology, definitions will apply to both invention aspects.

The first common term of both invention aspects is "catalysts." "Catalysts" as used herein refers to any chemical species required in order for a given reaction to proceed, e.g., a polymerization reaction, excluding monomers or comonomers, or other type of reaction. Thus, catalysts may include conventional catalysts as well as switching additives, for example, chain transfer agents. Non-limiting examples may include metallocenes, other polymerization catalysts such as conventional Ziegler-Natta type catalysts, constrained geometry and other transition metal complexes, combinations thereof, and the like.

"Co-catalysts" as used herein refers to any chemical species which can activate the catalyst used therewith, but which does not alone provide sufficient catalytic activity to make its sole use desirable in a particular application. Non-limiting examples may include alumoxanes, also referred to as alkylaluminoxanes; boron-based compounds such as trisperfluoroaryl and polyhalogenated heteroboranes; and ionizing co-catalysts containing an active proton or other cation associated with, but not coordinated to or only loosely coordinated to, an anion of the ionizing compound. See, for example, European publications EP-A-570982, EP-A-520732, EP-A-495375, EP-A-500944, EP-A-277 003 and EP-A-277004, and U.S. Pat. Nos. 5,153,157, 5,198,401, 5,066,741, 5,206,197, 5,241,025, 5,384,299 and 5,502,124. Also included in non-limiting embodiments are co-catalysts comprising non-coordinating anions, generically referred to as expanded anions, such as are further disclosed in U.S. Pat. No. 6,395,671. Among these are those having imidazolide, substituted imidazolide, imidazolinide, substituted imidazolinide, benzimidazolide, or substituted benzimidazolide anions. Combinations thereof and the like are also comprehended within the term "co-catalysts."

"Scavengers" as used herein refers to any chemical species added to a reaction or mixture to remove or inactivate species deemed to be impurities or contaminants. Non-limiting examples may include Lewis acids, such as trialkylaluminum compounds, dialkylzinc compounds, and dialkylaluminumalkoxides; Lewis bases, such as organic ether, polyether, amine, and polyamine compounds; hydroxycarboxylate metal salts; combinations thereof; and the like.

"Additives" as used herein refers to catalysts, co-catalysts, and/or scavengers, collectively, as well as any other components that may be either included in a reaction to modify the reaction or added to a reaction product in order to modify that product post-formation. The term may be singular or plural, depending upon its use in context. Non-limiting examples may include chain-shuttling agents, such as diethyl zinc; metal salts of fatty acids, such as aluminum and calcium stearates; antistatic agents, such as fatty amines; plasticizers; fillers; pigments, dyes, and colorants; flame retardants; processing aids, thermal enhancement materials; ultraviolet light stabilizers; stabilizers relating to other properties; combinations thereof; and the like.

"Reaction or mixing site" as used herein refers to the location where either the product reaction chemistry begins, i.e., where the starting reactant materials first come into contact with one another the reaction site, or where the product of that first reaction undergoes any post-formation modification(s), regardless of the number of total modifications, and potentially total reaction or mixing sites, are involved in a single production train. The term is therefore intended to avoid distinctions between chemical reactions and physical interactions, and thus generally refers to any location where an additive is effecting a modification such that what comes out of the site is different from what came into it in a given production train. Such location is frequently a reaction vessel of some type, but may alternatively be a stirred tank reactor, mixhead, reaction injector device, spray device, mix tank, or the like. The additive(s) enter(s) the reaction or mixing site via a "means of ingress." Such means of ingress is simply any opening through which an additive (frequently but not necessarily in a carrier solvent) may be introduced into the reaction or mixing site.

The next common term is "additive sources." Such sources may be desirably configured as, in non-limiting and interchangeable embodiment, canisters, cylinders, iso containers, or other containers suitable to be pre-filled or pre-loaded with an additive, with or without a carrier solvent, and desirably closed in such a way as to ensure suitable protection of both the additive and the surrounding environment. Because the "at least two additive sources" are further "detachably connected via conduit" to the means of ingress of the reaction or mixing site, it is desirable that, at some point along or at either end of that portion of a production train between each additive source and the means of ingress to a given reaction or mixing site (e.g., flow lines, including any intervening valving, storage tanks, process control input locations, pumps, meters, combinations thereof, and the like), there is such a means of detachment. By "detachably connected" is meant that flow between the additive source and the means of ingress can be shut off and the additive source effectively removed from the reaction activity as a process. This shut off capability should desirably also include a means to maintain an inner atmosphere, in contact with the additive, such that the quality/character of the additive is not undesirably compromised during the process to connect or detach the additive source from the additive line and any storage means, if applicable, such as an additive day tank. Such a detachable connection may therefore desirably include, in certain embodiments, valving of some type, enabling flow to be shut down prior to or simultaneously with actual separation of the additive source, with or without all or any portion of conduit between the additive source and the means of ingress. Some means of securely attaching or reattaching the additive source, e.g., a locking mechanism of some type, which is preferably simple and convenient for manual operation, is also desirable. Those skilled in the art will be able to easily envision suitable embodiments of such a mechanism, but for illustration purposes only, the detachable connectors available from Parker Corporation under the tradename SNAP-TITE 71 Series; quick release couplings available from Hindustan Engineers; and many of a variety of cam and groove type couplings available from Dunham Rubber & Belting Corporation may be among those considered as useful.

An important feature of the invention is that the at least two additive sources are also connected, directly or indirectly, to a "process control means." By "process control means" is meant, without limitation, any type of automated means of pre-selecting or otherwise controlling stopping and starting of flow and also flow rate of the at least two additive sources. As used herein, the term "automated" refers generally to the use of control systems and information technologies to reduce the need for human work in the production process. Such automation as used herein may be simply manually controlled electrical signals (constituting direct control) or, in preferred embodiments, via computerized, programmable instructions that operate or coordinate with, including in preferred embodiments receiving input from, any necessary flow control devices, such as valves, pressure regulators, pumps, and the like (constituting indirect control). In particularly preferred embodiments, the process control means may also include the capability to receive from each additive source information concerning the amount of additive used and/or remaining therein, in order to either enable a human operator to carry out an additive replenishment operation when the additive is at or near exhaustion, or to automatically either cease flow from that additive source and/or to automatically switch to another additive source or sources at that time.

The inventive apparatus has capabilities that impart a highly desirable level of flexibility to a production train as to which additive switches, combinations and variations thereof, concentration variations, and the like are desired in order to enable rapid and convenient product changes, additive experimentation, or both. Such may be accomplished hereby without the need for undesirable and expensive shutdown time, difficult or unsafe transitions, or even, in some cases, significant capital expenditures for additional production trains.

In general, operation of the inventive method may be described as one wherein a selected additive desirably flows, following initiation of flow, from its container through conduit (e.g., a metal pipe) and into the reaction site (e.g., a vessel), at some point passing through both a means of detachment and a means of stopping or slowing (i.e., controlling) flow. These two means—that of detachment and that of physical flow impedance—may be configured together, e.g., a valve connected with a detachable lock, or may be entirely separate. If separate, it is highly desirable that a means of stopping flow completely be included on both sides of the means of detachment to prevent spillage of either additive material or reaction or mixing site material, e.g., monomers, when the additive source is removed for replenishment with a new additive source, or for substitution of a different additive type.

The Example and FIG. 1 are included herewith only to better illustrate certain non-limiting embodiments of the invention, and not as representing any limitation to the scope of the invention. Additional embodiments falling within the scope of the claims appended herewith may be easily envisioned by those skilled in the art.

EXAMPLE

This Example refers to FIG. 1. FIG. 1 is a schematic diagram of one embodiment of the invention, showing a system to deliver either just one additive at a time to a reaction site, but enabling convenient switching between two or more additive sources under conditions such as, for example, exhaustion of one of the sources. As has been described hereinabove, however, any number of such systems may feed into a single given reactor.

The overall additive delivery system is designated as numeral 3. In this system, a solvent 4 is delivered via solvent source line 5 to solvent tank 8, which is controlled by process controller 10. This solvent 4 then feeds into solvent line 11 (which also potentially feeds to other additive systems, as suggested by the arrow on solvent additive line 11) and from there into additive line 14.

Essentially concurrently with the solvent movement into and through additive line 14, a desired additive 15, which has been pre-loaded into a (portable) additive supply cylinder 17, is moved, via appropriate signal from process controller 10, into additive line 20, passing first through coupling 18 which connects additive supply cylinder 17 and additive line 20. On either side of coupling 18 are valves 19, which control initiation, cut-off and/or rate of flow into additive line 20. Also connected to solvent additive line 20 is an additive level indicator 21 (which may alternatively be located in or appropriately associated directly or more closely with additive supply cylinder 17) that transmits information concerning the amount of additive remaining in the additive supply cylinder 17 in order to ensure appropriate cut-off of flow by process control 10 and/or timely replacement of additive supply cylinder 17. The additive 15 then enters additive day tank 23 where it may be stored for an indeterminate period of time and, from there, moves to additive input line 26. Additive input line 26 adjoins solvent line 14, enabling solubilization of the additive 15 in the solvent 4. A control rate device 27, e.g., a valve, is positioned on additive input line 26 to ensure appropriate control of the addition of the additive to the solvent and, thereby, appropriate concentration. Such control rate device 27 further, by definition, controls initiation and termination of flow as desired. Again, process control 10 exerts appropriate signals to enable appropriate movements of liquids, which may desirably employ appropriate pumping means (not shown).

The additive/solvent combination then continues along solvent line 14 to injection pump 29, and from thence to reactor input line 32, eventually moving into the reaction site itself (not shown). (In alternative embodiments, this could be a mixing site.)

Numerals 35, 38, and 41 indicate just three potential connection locations, equivalent to that represented by additive input line 26, for other additives to enter solvent line 14. In theory, the number of such additional additives is unlimited. It is to be understood that at least a second additive supply cylinder (not shown) is a part of multi-additive delivery system 3, and that the at least second additive supply cylinder may be coupled at, for example, coupling 18 when, for example, the first additive supply cylinder 17 has been exhausted or, in another embodiment, may be coupled at one of the locations 35, 38 or 41, a second additive delivery train duplicating that represented by 17, 18, 19, 20, 21, 23, and 26, collectively. Such second additive delivery train may have its own process control means, or may also be connected with process control means 10. In such other embodiment, it may be used to introduce the same, or a different, additive into the reactor via this duplicate additive delivery train. Hybrid additive delivery trains are also herein envisioned, such as wherein multiple additive supply cylinders 17 are connected to a single additive day tank 23, or conversely, where a single additive supply cylinder 17 is connected to multiple additive day tanks 23. The desirability of such flexibility will be apparent to those skilled in the art.

The FIGURE includes dotted lines representing potential points of control at which the process control means 10 may effectively exert flow control. These include, but are not necessarily limited in practice to, dotted line 45, which may receive input regarding and/or control flow in and to additive 15 in additive supply cylinder 17; dotted line 46, which may receive input regarding and/or control flow in additive line 20; dotted line 51, which may receive input regarding and/or control flow in the additive day tank 23; dotted line 54, which may receive input regarding and/or control flow in the additive input line 26; dotted line 57, which may receive input regarding and/or control flow in solvent tank 8; dotted line 60, which may receive input regarding and/or control flow in additive line 14; dotted line 63, which may receive input regarding and/or control flow between additive input line 26 and additive line 14; and dotted line 66, which may receive input regarding and/or control flow approximately at injection pumpo 29, i.e., between additive line 14 and reactor input line 32.

What is claimed is:

1. An apparatus for delivery of at least one additive to at least one polyolefin polymerization reaction site or polyolefin compounding site, comprising:
   (a) at least one means of ingress detachably connected to the at least one polyolefin polymerization reaction site or polyolefin compounding site,
   (b) at least one delivery components comprising a first additive source connected intermittently or continuously in series to a second additive source via at least one detachable means for connection, wherein the second additive source is connected to the at least one means of ingress via the at least one detachable means for connection, and wherein the second additive source is capable of providing continuous flow of the at least one additive into the at least one polyolefin polymerization reaction site or polyolefin compounding site via the at least one means for ingress, and
   (c) a process control means connected at least to the second additive source, wherein the process control means controls flow of the at least one additive from the second additive source to the at least one means of ingress, wherein controlling flow includes initiation, cessation, and rate of flow of the at least one additive.

2. The apparatus of claim 1 wherein the first and second additive sources are selected from the group consisting of canisters, iso containers, cylinders, and combinations thereof.

3. The apparatus of claim 1, wherein the process control means comprises automated means that send or receive electrical signals to or from at least one device selected from the group consisting of pumps, valves, meters, conduits, and combinations thereof.

4. A method for delivery of at least one additive, comprising
   selecting an apparatus for delivery of the at least one additive according to claim 1,
   controlling flow of the at least one additive to the polyolefin polymerization reaction site or polyolefin compounding site via the apparatus under conditions such that the at least one additive is continuously delivered to the polyolefin polymerization reaction site or polyolefin compounding site at a pre-selected time, for a pre-selected duration, and at a pre-selected rate, wherein controlling flow includes initiation, cessation, and rate of flow.

5. The method of claim 4, further comprising transitioning between a plurality of the at least one the additive during the controlling.

6. The method of claim 5, wherein the transitioning is swung on the fly between the plurality of the at least one additive without shutting down flow.

* * * * *